United States Patent
Jaradi et al.

(10) Patent No.: US 11,975,681 B1
(45) Date of Patent: May 7, 2024

(54) LOAD-LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/164,986

(22) Filed: Feb. 6, 2023

(51) Int. Cl.
  *B60R 22/34* (2006.01)
  *B60R 22/46* (2006.01)

(52) U.S. Cl.
  CPC ............ *B60R 22/46* (2013.01); *B60R 22/341* (2013.01); *B60R 22/3413* (2013.01); *B60R 2022/468* (2013.01)

(58) Field of Classification Search
  CPC ............... B60R 22/3413; B60R 22/34; B60R 2022/468; B60R 22/46
  See application file for complete search history.

(56) References Cited

U.S. PATENT DOCUMENTS

| | | | | |
|---|---|---|---|---|
| 5,794,876 A | * | 8/1998 | Morizane | ............ B60R 22/4633 242/374 |
| 6,105,893 A | | 8/2000 | Schmidt et al. | |
| 9,555,766 B2 | | 1/2017 | Yamamoto | |
| 11,780,404 B1 | * | 10/2023 | Jaradi | .................... B60R 22/202 280/805 |
| 2002/0113424 A1 | * | 8/2002 | Smith, Jr. | ........... B60R 22/3413 280/806 |
| 2011/0089280 A1 | * | 4/2011 | Ando | ..................... B60R 22/46 242/374 |
| 2015/0224958 A1 | * | 8/2015 | Lee | ....................... B60R 22/405 242/382 |
| 2018/0319363 A1 | * | 11/2018 | Faruque | ............... B60R 22/405 |
| 2019/0031139 A1 | * | 1/2019 | Liteplo | .................. B60R 22/48 |
| 2021/0221326 A1 | * | 7/2021 | Jaradi | ..................... B60R 22/36 |

FOREIGN PATENT DOCUMENTS

| | | | | |
|---|---|---|---|---|
| BR | PI0705972 A2 | * | 3/2017 | |
| CN | 212073957 U | | 12/2020 | |
| CN | 113183915 A | | 7/2021 | |
| CN | 110662674 B | * | 9/2022 | ............ B60R 22/28 |
| DE | 215047 A5 | * | 10/1984 | |
| EP | 3254911 A1 | * | 12/2017 | ............ B60R 22/46 |
| EP | 3254912 A1 | * | 12/2017 | ............ B60R 22/46 |
| WO | 2008149698 A1 | | 12/2008 | |

* cited by examiner

*Primary Examiner* — Nicole T Verley
(74) *Attorney, Agent, or Firm* — Frank A. MacKenzie; Bejin Bieneman PLC (57) ABSTRACT

A seatbelt retractor includes a frame and a spool having a first end and a second end each rotatably supported by the frame. The spool is elongated on an axis from the first end to the second end. The seatbelt retractor includes a plurality of torsion posts fixed to the frame. The seatbelt retractor includes a locking device operatively coupled between the spool and the plurality of torsion posts.

18 Claims, 7 Drawing Sheets

LOAD-LIMITING SEATBELT RETRACTOR

BACKGROUND

A seatbelt in a vehicle may be equipped with load-limiting features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression. The load-limiting features typically include a torsion bar disposed within a spool of the retractor.

DETAILED DESCRIPTION

A seatbelt retractor includes a frame and a spool having a first end and a second end each rotatably supported by the frame. The spool is elongated on an axis from the first end to the second end. The seatbelt retractor includes a post threadedly coupled to the frame. The seatbelt retractor includes a spring between the post and the frame. The seatbelt retractor includes a locking device operatively coupled between the spool and the post to engage the spool with the post.

The post may be rotatable about an axis that may be parallel to the axis of the spool.

The seatbelt retractor may include a cylinder fixed to the frame, the post being threadedly engaged with the cylinder. The cylinder defines a bore receiving the post. The bore may have internal threads and the post may have external threads engaged with the internal threads. The post may be rotatable about an axis that may be parallel to the axis of the spool.

The seatbelt retractor may include a gear coaxial with the spool and rotatably supported by the frame. The locking device may be lockable with the gear. The locking device may include an inertia clutch supported by the spool and lockable with the gear. The gear may include teeth and the post may include teeth engaged with the teeth of the gear. The teeth on the post may be fixed relative to the post and arranged circumferentially around the post.

The seatbelt retractor may include a second post threadedly coupled to the frame. The second post may include teeth engaged with the teeth of the gear. The seatbelt retractor may include a second spring between the second post and the frame. The spring may include a top and the second spring may include a top. The top of the spring may be adjacent the post and the top of the second spring may be adjacent the second post.

The top of the spring abuts the post and the top of the second spring is spaced from the post.

The top of the spring may be spaced from the post and the top of the second spring may be spaced from the second post.

The top of the spring may be spaced from the post by a first distance and the top of the second spring may be spaced from the second post by a second distance larger than the first distance.

The spring may have a first spring constant and the second spring may have a second spring constant greater than the first spring constant.

The post and the second post may be spaced circumferentially around the spool.

The seatbelt retractor may include a webbing wound around the spool.

The seatbelt retractor may include a return spring supported by the frame and operatively engaged with the spool.

With reference to the Figures, wherein like numerals indicate like parts throughout the several views, a vehicle 10 with a seatbelt retractor 12 is shown. The seatbelt retractor 12 includes a frame 14 and a spool 16 having a first end 18 and a second end 20 each rotatably supported by the frame 14. The spool 16 is elongated on an axis A1 from the first end 18 to the second end 20. The seatbelt retractor 12 includes a post 22 threadedly coupled to the frame 14. The seatbelt retractor 12 includes a spring 24 between the post 22 and the frame 14. The seatbelt retractor 12 includes a locking device 26 operatively coupled between the spool 16 and the post 22 to engage the spool 16 with the post 22.

The locking device 26 selectively engages the spool 16 with the post 22 in response to deceleration of the vehicle 10, as described further below. When the spool 16 is engaged with the post 22 by the locking device 26, rotational force on the spool 16 is transmitted to rotational force on the post 22. When the spool 16 is engaged with the post 22, force exerted on webbing 30 of the seatbelt retractor 12 urges the spool 16 to rotate and the spool 16 transmits rotational force to the post 22. This rotational force on the post 22 urges the post 22 to rotate relative to the frame 14 through the threaded coupling to the frame 14 against the bias of the spring 24. When force on the webbing 30 exceeds the spring force of the spring 24, the post 22 rotates relative to the frame 14 toward the spring 24 to compress the spring 24 and provide regulated payout of the webbing 30 from the spool 16.

Figure 1:
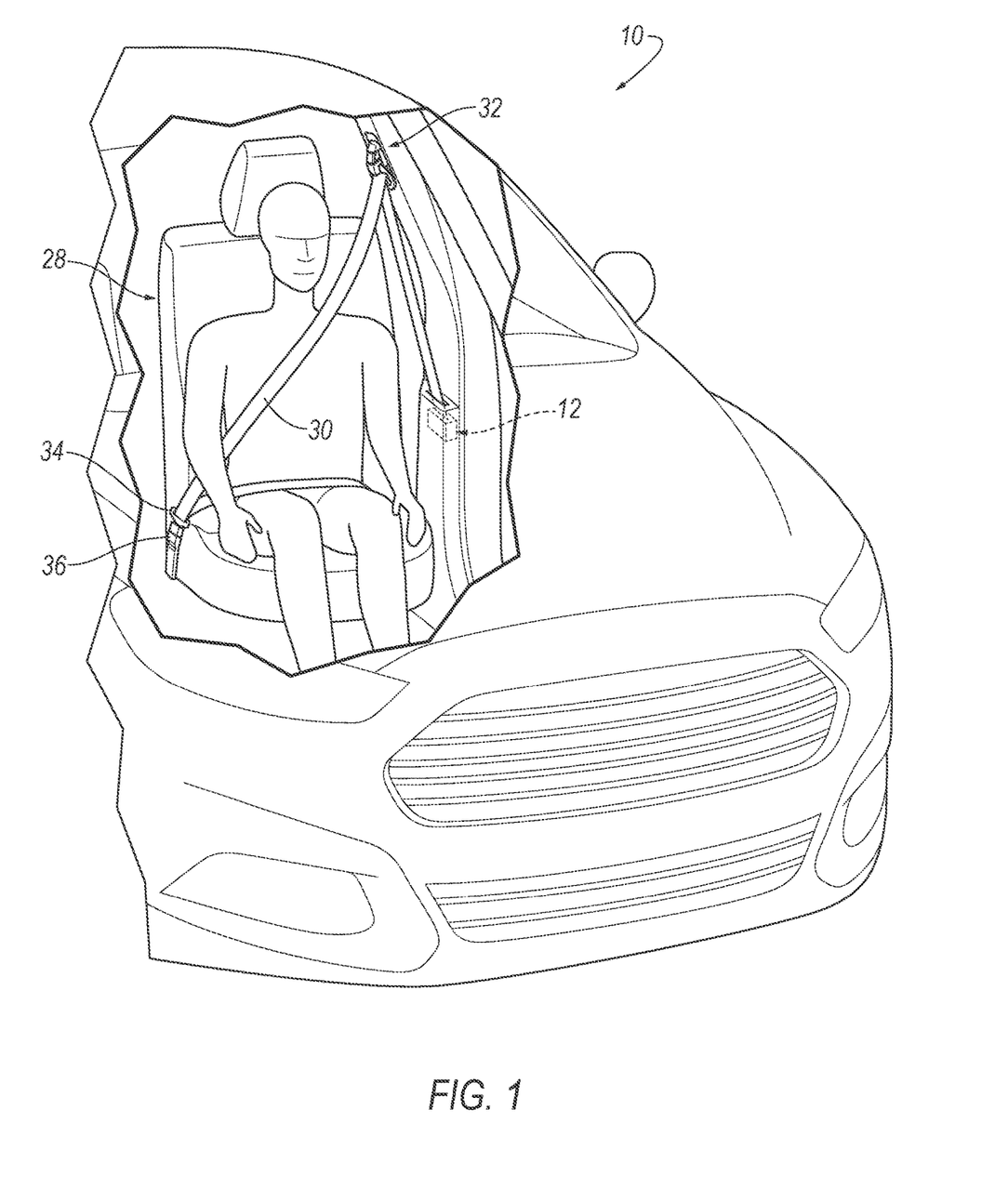
FIG. 1 is a perspective view of a vehicle including a seatbelt assembly.

With reference to FIG. 1, the vehicle 10 may be any suitable type of ground vehicle 10, e.g., a passenger or commercial automobile such as a sedan, a coupe, a truck, a sport utility, a crossover, a van, a minivan, a taxi, a bus, etc.

The vehicle 10 includes a frame (not numbered) and a body (not numbered). The body may be of unitary construction, in which the frame is unitary with the body including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc. The frame and/or the body defines a passenger compartment (not numbered) to house occupants, if any, of the vehicle 10. The passenger compartment may extend across the vehicle 10, i.e., from one side to the other side of the vehicle 10. The passenger compartment includes a front and a rear.

The vehicle 10 includes one or more seats 28 in the passenger compartment. The seats 28 may be arranged in any suitable manner in the passenger compartment. The seats 28 may be of any suitable type, e.g., a bucket seat, bench seat, etc. The vehicle 10 may include any suitable number of seatbelt assemblies 32, for example, one seatbelt assembly 32 for each seat 28.

The seatbelt assembly 32 includes the seatbelt retractor 12 and the webbing 30 extendable from the seatbelt retractor 12. The seatbelt assembly 32 may include an anchor (not shown) coupled to the webbing 30, and a clip 34 that engages a buckle 36. The seatbelt assembly 32 may be disposed adjacent the seat 28. For example, the seatbelt assembly 32 may be adjacent the front seat 28. The seatbelt assembly 32, when fastened, is designed to control the kinematics of the occupant during a vehicle 10 impact or a sudden stop. The seatbelt assembly 32 may be a three-point harness, as shown in the example in the Figures.

The webbing 30 may extend continuously from the seatbelt retractor 12 to the anchor. For example, one end of the webbing 30 is fixed to the spool 16 in the seatbelt retractor 12 and the other end of the webbing 30 is fixed to the anchor. The anchor may, for example, be fixed to the body of the vehicle 10 (e.g., the floor, a pillar, etc.), the seat 28, etc.

The webbing 30 is wound around the spool 16. The webbing 30 may be fabric, e.g., polyester. The clip 34 slides freely along the webbing 30 and, when engaged with the buckle 36, divides the webbing 30 into a lap band and a shoulder band.

The seatbelt retractor 12 provides payout and retraction of the webbing 30, e.g., via rotation of the spool 16 in one direction or another. As described above, the seatbelt retractor 12 includes the frame 14. The frame 14 supports other components of the seatbelt retractor 12. The frame 14 may include a first plate 42 and a second plate 44 spaced from the first plate 42 along the axis A1. The frame 14 may be of any suitable size and shape. The frame 14 may be of any suitable material, e.g., plastic, metal, composite, etc. The seatbelt retractor 12 may be supported at any suitable location in the vehicle 10.

As set forth above, the spool 16 is rotatably supported by the frame 14. Specifically, the first end 18 of the spool 16 is rotatably supported by, for example, the first plate 42 of the frame 14. The second end 20 of the spool 16 is rotatably supported by, for example, the second plate 44 of the frame 14. In other words, the spool 16 is free to rotate about the axis A1 relative to the first plate 42 and the second plate 44 when the locking device 26 is unlocked.

The spool 16 is elongated on the axis A1 from the first end 18 to the second end 20. The spool 16 is rotatable about the axis A1. For example, the first end 18 of the spool 16 may be supported in an opening defined by the first plate 42 and the second end 20 may be supported in an opening defined by the second plate 44.

Figure 2:
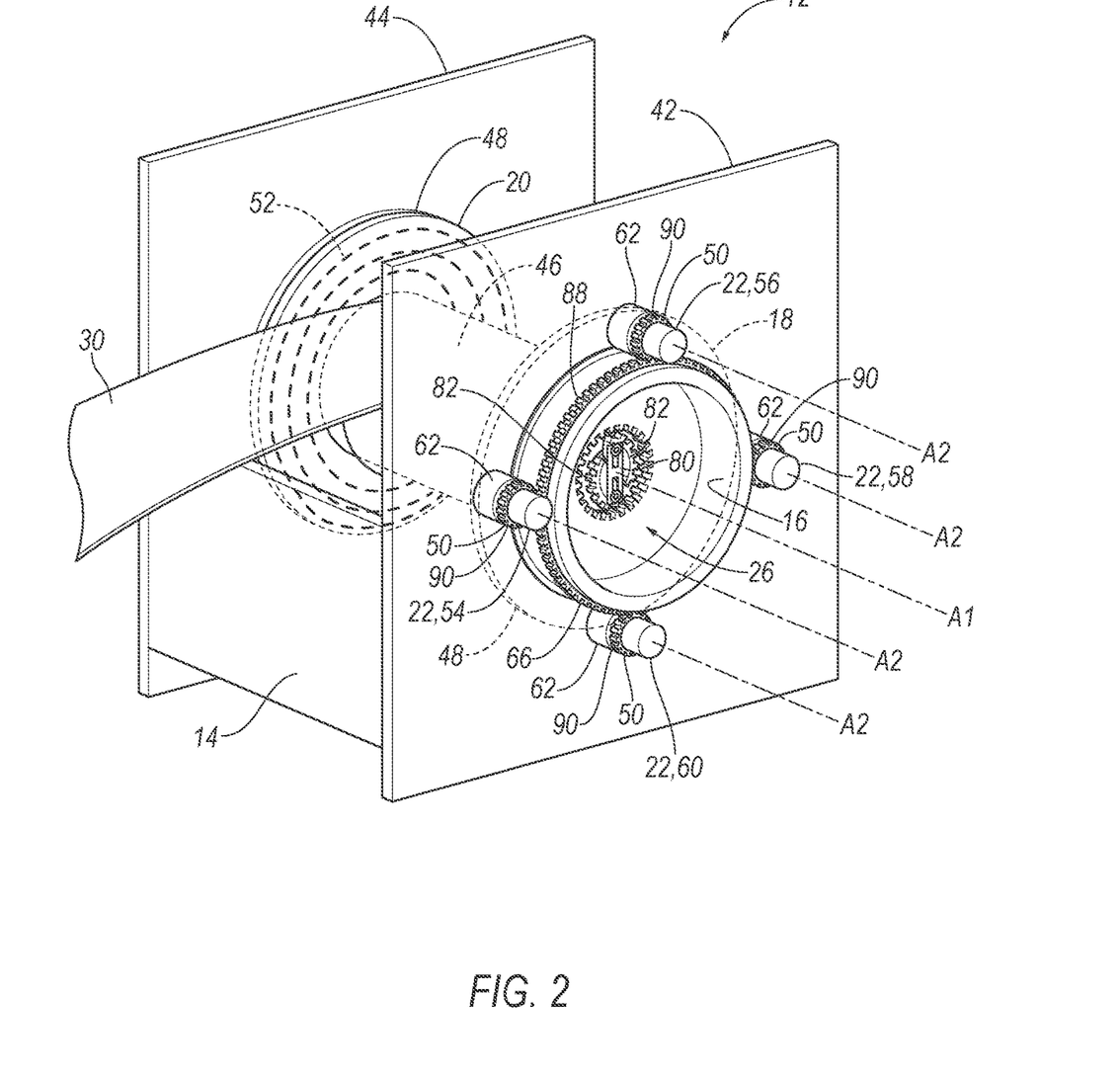
FIG. 2 is a perspective view of a seatbelt retractor in an unlocked position.
Figure 3:
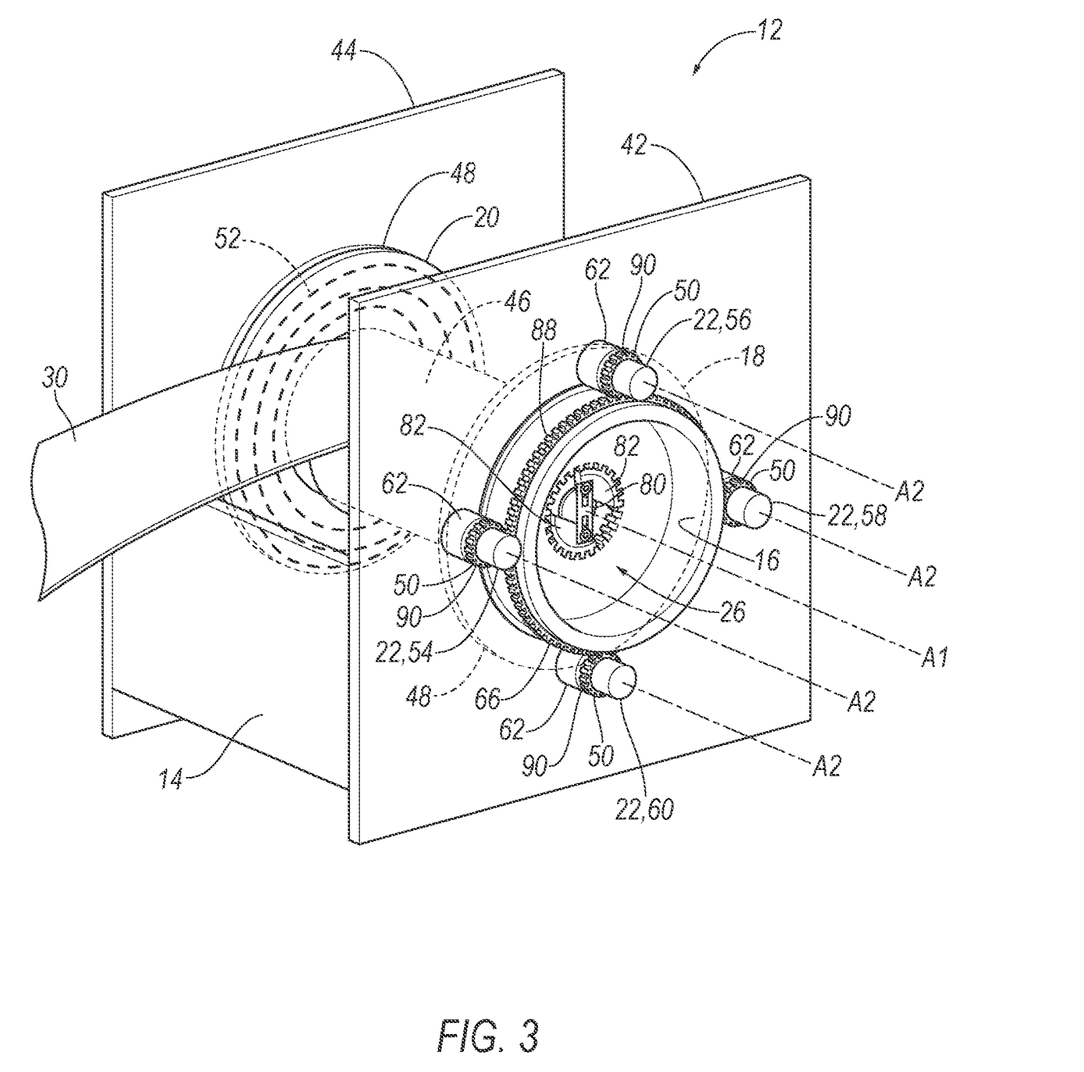
FIG. 3 is a perspective view of the seatbelt retractor in a locked position.

With reference to FIGS. 2 and 3, the spool 16 may include a cylinder 46 and two flanges. The cylinder 46 may be elongated along the axis A1 between the first end 18 and the second end 20. As an example, shown in the Figures, the spool 16 includes one flange at the first end 18 of the spool 16 and the other flange at the second end 20 of the spool 16. The cylinder 46 is elongated from one flange to the other flange. The flanges maintain the position of the webbing 30 relative to the spool 16, i.e., the webbing 30 is between the flanges. As shown in the Figures, the flanges extend radially away from the axis A1. The spool 16 may be free of having a torsion bar therein, e.g., at least because the posts 22 external of the spool 16 may control rotation of the spool 16. In other words, the seatbelt retractor 12 may not include a conventional torsion bar connecting the locking device 26 to the spool 16.

The webbing 30 is supported by the spool 16. Specifically, the webbing 30 is supported on the cylinder 46 between the two flanges. The cylinder 46 may include a slot elongated along the axis A1. The slot is sized and shaped to receive the webbing 30. The webbing 30 may be in the slot and wound around the spool 16. The webbing 30 may be, for example, fixed to the spool 16 through the slot. The webbing 30 may be fixed to the spool 16 in any suitable manner.

The seatbelt retractor 12 includes a return spring 52. The return spring 52 may be supported by the frame 14 and operatively engaged with the spool 16 to apply torque to the spool 16 relative to the frame 14. The return spring 52 may be coupled to the spool 16 and the frame 14. In the example shown in FIGS. 2 and 3, the return spring 52 is disposed at the first plate 42 of the frame 14 and is engaged with the first end 18 of the spool 16 to retract the webbing 30. The return spring 52 may be loaded in tension or compression when the webbing 30 is fully retracted, and the return spring 52 may be further loaded in either tension or compression when the webbing 30 is extended from the spool 16. When force is exerted on the webbing 30, the return spring 52 may uncoil and the webbing 30 may payout from the spool 16. When the force applied to the webbing 30 is released, no rotational force is exerted on the spool 16 and the return spring 52 exerts a force tending to retract the webbing 30. The return spring 52 may be, for example, a spiral torsion return spring 52 or any other suitable type of return spring 52.

The seatbelt retractor 12 includes at least one post 22 and at least one spring 24. Each post 22 includes at least one spring 24 between the post 22 and the frame 14. In the example including more than one post 22, the posts 22 may be equally spaced about the axis A1. In the example shown in the Figures, the vehicle 10 includes one seatbelt retractor 12 that includes four posts 22 threadedly coupled to the frame 14.

Specifically, in the example shown in the Figures, the seatbelt retractor 12 includes four posts 22, namely a first post 54, a second post 56, a third post 58 and a fourth post 60. In other examples the seatbelt retractor 12 may include any number of posts 22, i.e., one or more. In the examples including more than one post 22, the posts 22 may be similar or identical to each other. In such an example including more than one post 22, the posts 22 are spaced circumferentially around the spool 16. The posts 22 rotate relative to the frame 14 to control payout of the webbing 30, e.g., when the locking device 26 is at the locked position and sufficient load is applied to the webbing 30 to rotate the posts 22 relative to the frame 14. In the example shown in the Figures, the posts 22 have common features and the common features are identified with common numerals for the first post 54 and the second post 56.

As set forth above, the post 22 is threadedly coupled to the frame 14. The post 22 may be threadedly coupled indirectly with the frame 14, e.g., through a component intermediate to the post 22 and the frame 14, such as a cylinder 62 as shown in the example in the Figures. In other examples, the post 22 may be threadedly engaged directly with the frame 14. Being threadedly coupled with the frame 14, the post 22 threadedly advances and retreats relative to the frame 14 when rotated, e.g., threadedly advances and retreats relative to the cylinder 62.

In the example shown in the Figures, the cylinder 62 is fixed to the frame 14. Specifically, the cylinder 62 extends from the second plate 44. In examples including more than one cylinder 62, the cylinders 62 may be spaced from each other circumferentially about the axis A1. The cylinders 62 may be equally spaced about the axis A1, e.g., with 90 degrees separating adjacent cylinders 62. Each cylinder 62 is coaxial with one of the posts 22 and at least one of the springs 24.

The cylinder 62 may define a bore 64 receiving the post 22, i.e., the cylinder 62 may be annular in cross section. Specifically, the post 22 may be adjustably coupled to the bore 64, i.e., moveable axial into and out of the bore 64. For example, the bore 64 may have internal threads 84 and the post 22 may have external threads 86 engaged with the internal threads 84 of the bore 64. The threads 84 of the post 22 and the threads 85 of the bore 64 are matching so that the post 22 is threadedly coupled with the bore 64. The threads 84, 86 are designed with a low-friction engagement to allow rotation of the post 22 relative to the bore 64 including during decompression of the spring 24, as described further below. The low-friction engagement of the threads 84, 86 aids in resettability of the seatbelt retractor 12.

The post 22 is rotatable about an axis A2 that is parallel to the axis A1 of the spool 16. In the example shown in FIGS. 6 and 7, the spool 16 is shaped to exert rotational force on the post 22 to linearly adjust the position of the post 22 relative to the spool 16, e.g., as the post 22 threadedly advances into and retreats from the cylinder 62.

The seatbelt retractor 12 may include a gear 66 coaxial with the spool 16 and rotatably supported by the frame 14. The spool 16 is rotatable relative to the gear 66 when the locking device 26 is unlocked, as described further below. When the locking device 26 is locked, the locking device 26 couples the spool 16 and the gear 66 so that the spool 16 and the gear 66 rotate together in unison. The locking device 26 is releasably locked to the gear 66, as described further below.

The gear 66 on the spool 16 includes teeth 88. The post 22 may include a gear 50 that includes teeth 90 engaged with the teeth 88 of the gear 66. The teeth 88 on the gear 66 and the teeth 90 on the post 22 transfer torque from the spool 16 to the post 22. The teeth 90 on the post 22 are arranged circumferentially around the post 22 and the teeth 88 on the gear 66 are arranged circumferentially around the gear 66. The teeth 88 on the gear 66 are fixed relative to the gear 66, e.g., via weld, press fit, fastener, spline, unitary construction with the post 22, etc. The teeth 90 on the post 22 are fixed relative to the post 22, e.g., via weld, press fit, fastener, spline, unitary construction with the post 22, etc. The teeth 90 on the post 22 are spaced from the frame 14 along the axis A2. For example, the teeth 90 on the post 22 may be fixed to distal ends of the post 22. In examples including more than one post 22, the teeth 90 on each post 22 are engaged with the teeth 88 of the gear 66. The teeth 88 on the gear 66 and the teeth 90 on each post 22 are meshed. In the example shown in the Figures, the teeth 88 on the gear 66 are equidistantly spaced circumferentially around the entire circumference of the gear 66 and the teeth 90 on the post 22 are equidistantly spaced circumferentially around the entire circumference of the post 22.

As set forth above, the seatbelt retractor 12 may include at least one spring 24. Specifically, the spring 24 is between the post 22 and the frame 14. For example, the spring 24 may be in the bore 64 of the cylinder 62. In the example shown in the Figures, the seatbelt retractor 12 includes four springs 24, namely a first spring 24, 68, a second spring 24, 70, a third spring 24, 72, and a fourth spring 24, 74. The spring 24 may be of any suitable material, for example, steel, aluminum, etc. In the Figures the spring 24 is shown as a coil spring 24, any suitable spring may be used, e.g., coil spring, disc spring, etc. In the example shown in the Figures, one spring 24 is in each cylinder 62. In other examples, more than one spring 24 may be in one cylinder 62. In such an example, the springs 24 in the cylinder 62 may be coaxial and have different lengths and/or different spring constants.

In examples including more than one cylinder 62, post 22, and spring 24 the springs 24 may have different spring constants relative to each other. For example, the first spring 24, 68 may include a first spring constant and the second spring 24, 70 may include a second spring constant greater than the first spring constant. The different spring constants may be provided, for example, by the springs 24 having different material and/or different geometry than each other.

Figure 4:
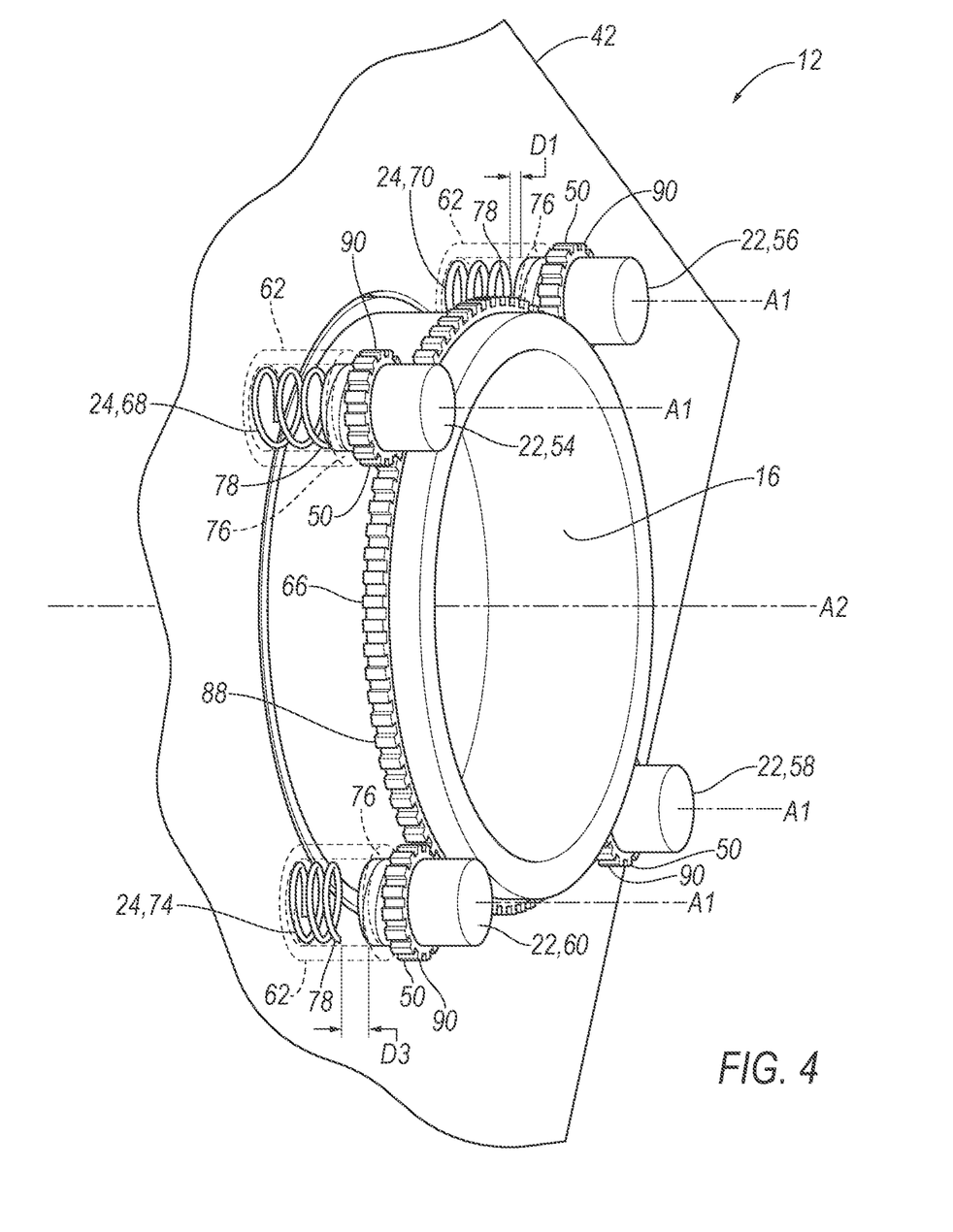
FIG. 4 is a perspective view of a portion of one example of the seatbelt retractor.
Figure 5:
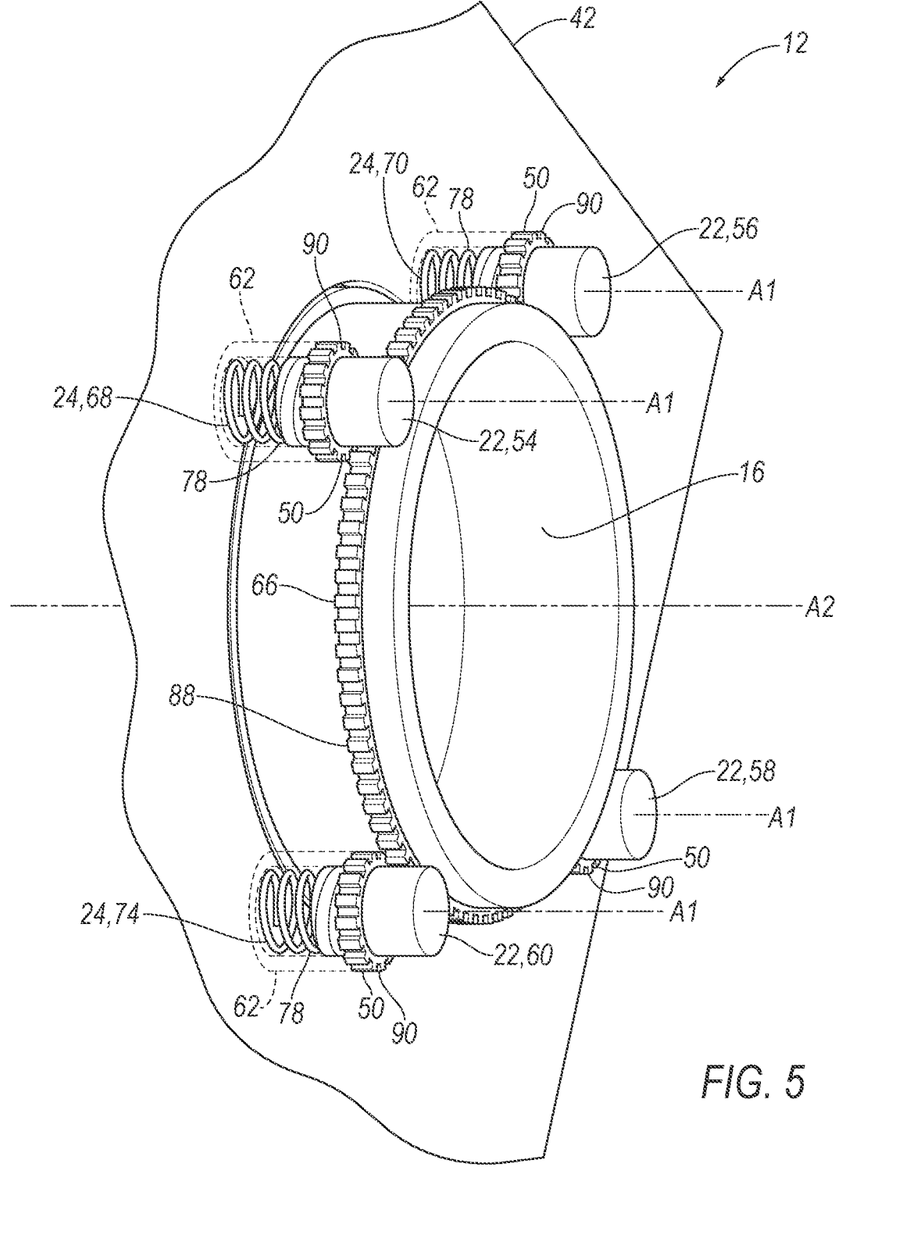
FIG. 5 is a perspective view of a portion of another example of the seatbelt retractor.
Figure 6:
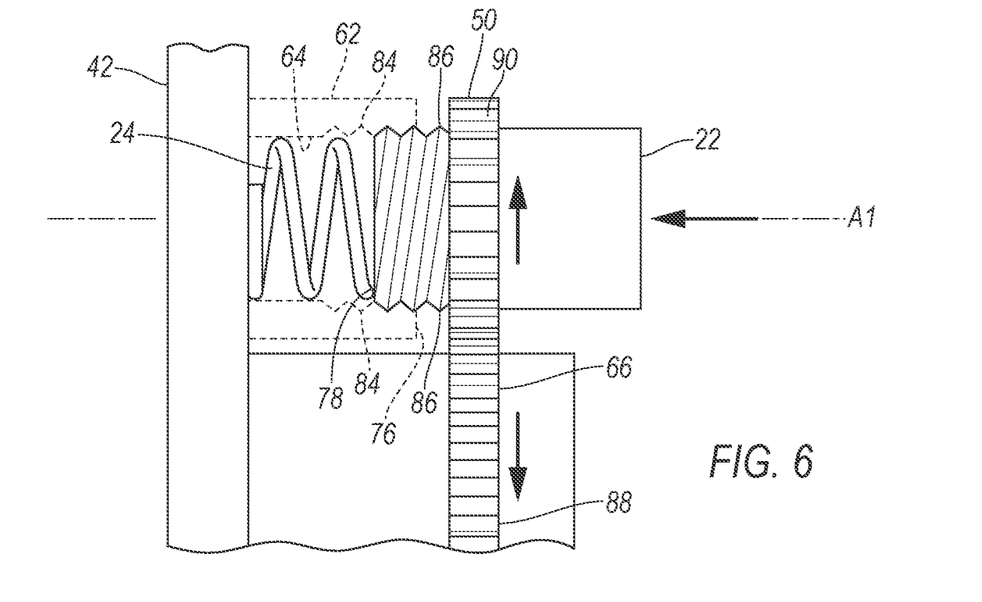
FIG. 6 is a side view of the seatbelt retractor having a post engaged and spring adjacent post.
Figure 7:
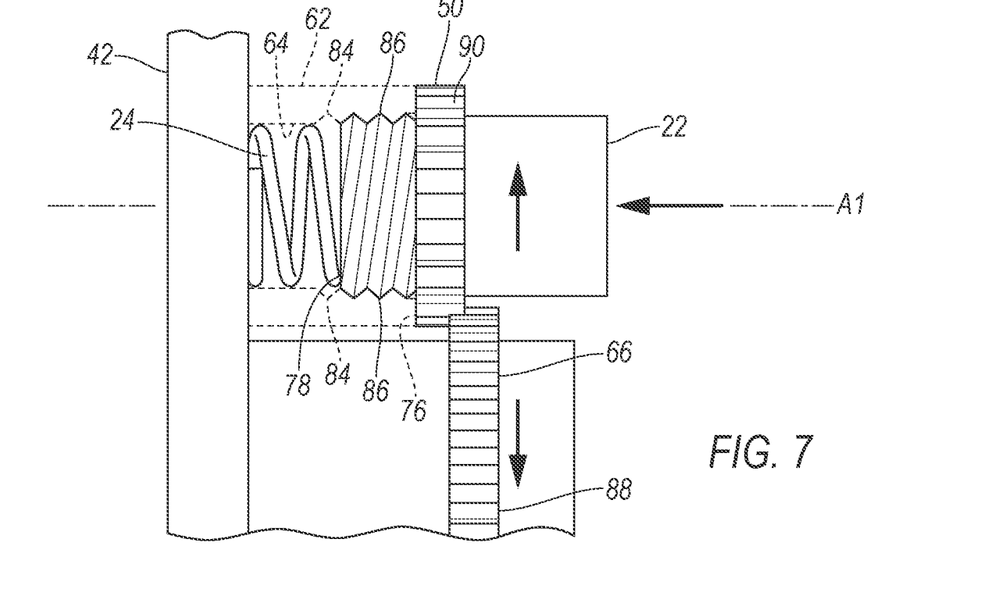
FIG. 7 is a side view of the seatbelt retractor having the post engaged and the spring biasing the post.
Figure 8:
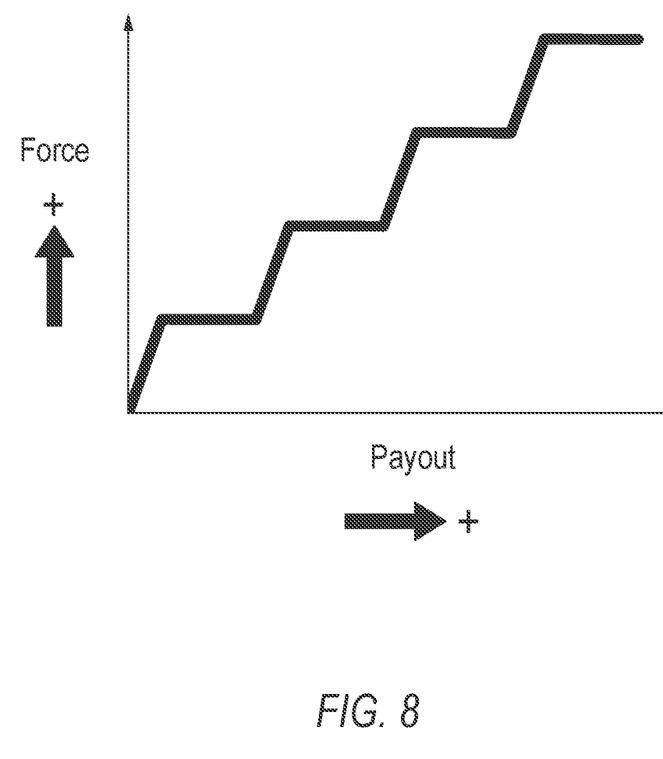
FIG. 8 is a hypothetical example of a force-payout curve of the retractor.

In the absence of force on the webbing 30, the post 22 and spring 24 are in a design position, as shown in FIGS. 4 and 6. The spring 24 resists rotation of the spool 16 relative to the frame 14 when the locking device 26 is locked. Specifically, when the locking device 26 is locked and force is exerted on the webbing 30 by the occupant to urge the spool 16 and gear 66 to rotate relative to the frame 14, as described above, the spring 24 resists the rotation of the spool 16 and gear 66 relative to the frame 14. In the event the force exerted on the webbing 30 is sufficient to compress the spring 24, the spool 16 and gear 66 rotate relative to the frame 14 as the spring 24 compresses and the post 22 and spring 24 move from the design position to a compressed position, as shown in FIGS. 5 and 7. A controlled amount of webbing 30, as described further below, is released from the retractor and the spring 24 absorbs some of the force exerted by the occupant on the webbing 30 as the spring 24 compresses during rotation of the spool 16 and gear 66 relative to the frame 14. The spring 24 may have a spring constant designed to absorb force exerted by the occupant on the webbing 30.

The controlled release of the webbing 30 is resettable. Specifically, when force on the webbing 30 by the occupant falls below the bias of the spring 24, the spring 24 decompresses to the pre-compression size. During this decompression, the spring forces the post 22 to return to its position. Specifically, when force is removed from the webbing 30, the post 22 and the spring 24 return to the design position.

The post 22 may have a hard stop at a maximum compressed position. For example, with reference to FIGS. 6 and 7, the cylinder 62 includes a lip 76. The teeth 90 on the post 22 are spaced from the lip 76 in the design position, as shown in FIG. 6, and abut the lip 76 in the maximum compressed position, as shown in FIG. 7. When the teeth 90 abut the lip 76 in the maximum compressed position, the teeth 90 prevent further threaded advancement of the post 22 into the cylinder 62.

With reference to FIGS. 6 and 7, the spring 24 includes a top 78. The top 78 of the spring 24 is adjacent the post 22.

With reference to FIG. 4, the top 78 of one or more of the springs 24 may be spaced from the respective post 22 in the design position and the top 78 of one or more of the springs 24 may abut the respective post 22 in the design position. In such an example, as the post 22 rotates and threadedly advances into the cylinder 62 when the locking device 26 is locked and force is exerted on the webbing 30 by an occupant, as described above, the resistance to payout of the webbing 30 is progressive. Specifically, the spring 24 that abuts the respective post 22 in the design position is first compressed during initial rotation of the spool 16 relative to the frame 14. If the posts 22 threadedly advances further into the respective cylinder 62 as the spool 16 rotates, the posts 22 that are spaced from the top 78 of the respective spring 24 eventually abuts and compresses that spring 24 to add resistance to rotation of the spool 16, i.e., to progressively resist payout of webbing 30 from the retractor.

In the example shown in the Figures including four cylinders 62, posts 22, and springs 24, one of the posts 22 abuts the respective spring 24 in the design position and each of the other posts 22 is spaced from the respective spring 24 by a different distance. Specifically, with reference to FIG. 4, for example, the first post 54 abuts the top 78 of the first spring 68, the second post 56 is spaced from the top 78 of the second spring 70 by a first distance Dl; the third post 58 is spaced from the top 78 of the third spring 72 by a second distance (not shown on FIG. 4) greater than the first distance Dl; and the fourth post 60 is spaced from the top 78 of the fourth spring 74 by a third distance D3 greater than the second distance. This results in four progressions of resistance to payout, as shown in FIG. 7. FIG. 7 is a hypothetical representation of the payout of the webbing 30 relative to the force applied by the webbing 30.

The seatbelt retractor 12 includes the locking device 26 operatively coupled between the spool 16 and the post 22 to engage the spool 16 with the post 22. As shown in FIG. 2, the locking device 26 is supported at the second end 20 of the spool 16 and the second plate 44 of the frame 14. The spool 16 may be between the return spring 52 and the locking device 26 along the axis A1. The locking device 26 is movable from an unlocked position, shown in FIG. 2, in which torque is not transferred from the spool 16 to the post 22 to a locked position, shown in FIG. 3, is which torque is transferred from the spool 16 to the post 22.

The locking device 26 may be lockable with the gear 66. Specifically, the locking device 26 is fixed to and rotates with the spool 16 when the locking device 26 is unlocked with the gear 66. When locked with the gear 66, the locking device 26 couples the gear 66 and the spool 16 so that the gear 66 and the spool 16 rotate together as a unit. The locking device 26 may include an inertia clutch 80 that move the locking device 26 from the unlocked position to the locked position in response to a vehicle deceleration of the inertia clutch 80 from deceleration of the vehicle 10. The inertia clutch 80 may be supported by the spool 16 and lockable with the gear 66. For example, the inertia clutch 80 may include one or more pawls 82 supported at the second end 20 of the spool 16. Centrifugal force from an increase in rotation speed of the spool 16, e.g., when a certain load is applied to the webbing 30, may urge the pawls 82 radial outward to the locked position. As another example, the locking device 26 may be moved from the unlocked position to the locked position in response to deceleration of the vehicle 10, e.g., a sudden slowing of the vehicle 10, sudden stop, impact, etc., of the vehicle 10. The locking device 26 may be moved from the unlocked position to the locked position in response to an activation sensor (not shown). The activation sensor senses sudden deceleration of the vehicle 10 and triggers activation of the locking device 26, i.e., moves the locking device 26 to the locked position. The locking device 26 may include any suitable structure for selectively transferring torque, e.g., including conventional structures. The locking device 26 is resettable. In other words, the locking device 26 may be unlocked from the gear 66, e.g., when the inertia clutch 80 is released, to allow the spool 16 to rotate freely relative to the gear 66.

The numerical adverbs "first," "second", "third," and "fourth" are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seatbelt retractor comprising:
    a frame;
    a spool having a first end and a second end each rotatably supported by the frame, the spool being elongated on an axis from the first end to the second end;
    a post threadedly coupled to the frame;
    a spring between the post and the frame; and
    a locking device operatively coupled between the spool and the post to engage the spool with the post.

2. The seatbelt retractor of claim 1, wherein the post is rotatable about an axis that is parallel to the axis of the spool.

3. The seatbelt retractor of claim 1, further comprising a cylinder fixed to the frame, the post being threadedly engaged with the cylinder.

4. The seatbelt retractor of claim 3, wherein the cylinder defines a bore receiving the post, the bore having internal threads and the post having external threads engaged with the internal threads.

5. The seatbelt retractor of claim 4, wherein the post is rotatable about an axis that is parallel to the axis of the spool.

6. The seatbelt retractor of claim 1, further comprising a gear coaxial with the spool and rotatably supported by the frame, the locking device being lockable with the gear.

7. The seatbelt retractor of claim 6, wherein the locking device includes an inertia clutch supported by the spool and lockable with the gear.

8. The seatbelt retractor of claim 6, wherein the gear includes teeth and the post includes teeth engaged with the teeth of the gear.

9. The seatbelt retractor of claim 8, wherein the teeth on the post are fixed relative to the post and arranged circumferentially around the post.

10. The seatbelt retractor of claim 8, further comprising:
    a second post threadedly coupled to the frame;
    the second post including teeth engaged with the teeth of the gear; and
    a second spring between the second post and the frame.

11. The seatbelt retractor of claim 10, wherein the spring includes a top and the second spring includes a top, the top of the spring is adjacent the post and the top of the second spring is adjacent the second post.

12. The seatbelt retractor of claim 11, wherein the top of the spring abuts the post and the top of the second spring is spaced from the post.

13. The seatbelt retractor of claim 11, wherein the top of the spring is spaced from the post and the top of the second spring is spaced from the second post.

14. The seatbelt retractor of claim 13, wherein the top of the spring is spaced from the post by a first distance and the top of the second spring is spaced from the second post by a second distance larger than the first distance.

15. The seatbelt retractor of claim 10, wherein the spring has a first spring constant and the second spring has a second spring constant greater than the first spring constant.

16. The seatbelt retractor of claim 10, wherein the post and the second post are spaced circumferentially around the spool.

17. The seatbelt retractor of claim 1, further comprising a webbing wound around the spool.

18. The seatbelt retractor of claim 1, further comprising a return spring supported by the frame and operatively engaged with the spool.

\* \* \* \* \*